US011156705B2

(12) United States Patent
Gardiner

(10) Patent No.: US 11,156,705 B2
(45) Date of Patent: Oct. 26, 2021

(54) SYSTEM AND METHOD FOR MITIGATING PLATFORM MOTION IN A COMMUNICATIONS SYSTEM

(71) Applicant: RAYTHEON COMPANY, Waltham, MA (US)

(72) Inventor: Thomas E. Gardiner, St. Petersburg, FL (US)

(73) Assignee: Raytheon Company, Waltham, MA (US)

(*) Notice: Subject to any disclaimer, the term of this patent is extended or adjusted under 35 U.S.C. 154(b) by 60 days.

(21) Appl. No.: 16/814,834

(22) Filed: Mar. 10, 2020

(65) Prior Publication Data
US 2021/0286062 A1 Sep. 16, 2021

(51) Int. Cl.
*G01S 11/08* (2006.01)
*H04W 56/00* (2009.01)
(Continued)

(52) U.S. Cl.
CPC ............ *G01S 11/08* (2013.01); *G01S 5/0289* (2013.01); *G01S 11/026* (2013.01); *H04W 56/003* (2013.01)

(58) Field of Classification Search
CPC ........ G01S 11/04; G01S 11/08; G01S 11/026; G01S 11/02; G01S 11/06; G01S 5/0289; G01S 5/14; G01S 5/02; H04W 56/003
(Continued)

(56) References Cited

U.S. PATENT DOCUMENTS 3,378,837 A 4/1968 Graves
5,790,939 A 8/1998 Malcolm et al.
(Continued)

FOREIGN PATENT DOCUMENTS

AU 2003 200 955 B2 7/2005
EP 1 035 666 A2 9/2000
(Continued)

OTHER PUBLICATIONS

Guidotti, et al. "Satellite-enabled LTE systems in LEO Constellations", IEEE International Conference on Communications workshops (ICC Workshops), May 21, 2017 (pp. 876-881).
(Continued)

*Primary Examiner* — Harry K Liu
(74) *Attorney, Agent, or Firm* — Lewis Roca Rothgerber Christie LLP

(57) ABSTRACT

A system and method for stabilizing a reference clock of a client transceiver to a reference terminal in the presence of relative motion between the client transceiver and the reference terminal. In some embodiments, the method includes: transmitting, by the client transceiver, a probe packet to the reference terminal, receiving, by the client transceiver, the probe packet from the reference terminal, receiving, by the client transceiver, a first synchronization packet from the reference terminal, and adjusting the rate of the reference clock based on the time elapsed between: the transmitting, by the client transceiver of the probe packet to the reference terminal, and the receiving, by the client transceiver, the probe packet from the reference terminal; and based on the time of reception, by the client transceiver, of the probe packet.

20 Claims, 10 Drawing Sheets

(51) Int. Cl.
*G01S 5/02* (2010.01)
*G01S 11/02* (2010.01)
(58) Field of Classification Search
USPC .......................................................... 342/458
See application file for complete search history.

(56) References Cited

U.S. PATENT DOCUMENTS

| | | | |
|---|---|---|---|
| 5,809,397 | A | 9/1998 | Harthcock et al. |
| 6,016,322 | A | 1/2000 | Goldman |
| 6,101,213 | A | 8/2000 | Van Allen |
| 6,667,963 | B1 | 12/2003 | Rantalainen et al. |
| 6,674,730 | B1 | 1/2004 | Moerder |
| 7,912,164 | B2 | 3/2011 | Armstrong et al. |
| 8,300,610 | B2 | 10/2012 | Tsudaka |
| 9,872,268 | B2 | 1/2018 | Vachula et al. |
| 10,084,535 | B1 | 9/2018 | Speidel et al. |
| 2002/0094797 | A1 | 7/2002 | Marshall et al. |
| 2003/0081603 | A1 | 5/2003 | Rune |
| 2003/0092448 | A1* | 5/2003 | Forstrom ............ G01C 21/206 455/456.1 |
| 2004/0143392 | A1 | 7/2004 | Kilfeather et al. |
| 2006/0077981 | A1* | 4/2006 | Rogers ................. H04L 47/115 370/395.21 |
| 2007/0218931 | A1 | 9/2007 | Beadle et al. |
| 2008/0285627 | A1 | 11/2008 | Bruas |
| 2010/0085908 | A1 | 4/2010 | Agarwal |
| 2012/0057479 | A1* | 3/2012 | Maruyama ............ H04J 3/0667 370/252 |
| 2012/0201193 | A1 | 8/2012 | Sugiyama et al. |
| 2012/0249366 | A1 | 10/2012 | Pozgay et al. |
| 2013/0170429 | A1 | 7/2013 | Yamamoto et al. |
| 2013/0211780 | A1* | 8/2013 | Meador ..................... G01S 5/14 702/158 |
| 2013/0268980 | A1 | 10/2013 | Russell |
| 2014/0169792 | A1* | 6/2014 | Lee ........................ H04J 14/08 398/66 |
| 2014/0225779 | A1 | 8/2014 | Kaufmann et al. |
| 2015/0078204 | A1 | 3/2015 | Thubert et al. |
| 2015/0138927 | A1 | 5/2015 | Shemesh et al. |
| 2015/0172197 | A1* | 6/2015 | Sun ....................... H04L 47/283 370/389 |
| 2017/0230925 | A1 | 8/2017 | Meiyappan et al. |
| 2017/0289822 | A1 | 10/2017 | Hreha et al. |
| 2019/0190806 | A1 | 6/2019 | Bhushan et al. |
| 2019/0280763 | A1 | 9/2019 | Smyth et al. |
| 2019/0313357 | A1 | 10/2019 | Wang et al. |
| 2019/0349877 | A1 | 11/2019 | Alasti et al. |
| 2019/0394770 | A1 | 12/2019 | Wang et al. |
| 2020/0153500 | A1 | 5/2020 | Kim et al. |

FOREIGN PATENT DOCUMENTS

| | | | |
|---|---|---|---|
| EP | 2 496 030 | A1 | 9/2012 |
| EP | 2 555 465 | A2 | 2/2013 |
| EP | 2 819 466 | A1 | 12/2014 |
| WO | WO 02/01775 | A1 | 1/2002 |
| WO | WO 2011/000041 | A1 | 1/2011 |
| WO | WO-2018151202 | A1 * | 8/2018 ............. H04W 4/38 |

OTHER PUBLICATIONS

International Search Report for related International Application No. PCT/US2020/053638, filed Sep. 30, 2020, International Search Report dated Jan. 27, 2021 and dated Feb. 9, 2021 (5 pgs.).

Written Opinion of the International Searching Authority for related International Application No. PCT/US2020/053638, filed Sep. 30, 2020, Written Opinion of the International Searching Authority dated Feb. 9, 2021 (6 pgs.).

U.S. Office Action from U.S. Appl. No. 16/816,139, dated Apr. 29, 2021, 10 pages.

International Search Report for corresponding International Application No. PCT/US2017/026671, filed Apr. 7, 2017, International Search Report dated Jul. 13, 2017 and dated Jul. 24, 2017 (3 pgs.).

Written Opinion of the International Searching Authority for corresponding International Application No. PCT/US2017/026671, filed Apr. 7, 2017, Written Opinion of the International Searching Authority dated Jul. 24, 2017 (5 pgs.).

National Institute of Standards and Technology, "Two Way Time Transfer", https://tf.nist.gov/time/twoway.htm, printed Apr. 23, 2020, 2 pages.

"Precision Time Protocol", https://en.wikipedia.org/wiki/Precision_Time_Protocol, edited Apr. 20, 2020, 6 pages.

Unpublished U.S. Appl. No. 16/816,139, filed Mar. 11, 2020.

Wechsler, Jill, "The Role of GPS in Precise Time and Frequency Dissemination", https://ilrs.gsfc.nasa.gov/docs/timing/gpsrole.pdf, GPSWorld Jul./Aug. 1990, 8 pages.

Qiao, et al., "The slot synchronization in space-ground integrated data link", Proceedings of SPIE, vol. 10697, Feb. 20, 2018, (pp. 106975J-1-106975J-10).

International Search Report for corresponding International Application No. PCT/US2020/053637, filed Sep. 30, 2020, International Search Report dated Jan. 18, 2021 and dated Jan. 27, 2021 (5 pgs.).

Written Opinion of the International Searching Authority for corresponding International Application No. PCT/US2020/053637, filed Sep. 30, 2020, Written Opinion of the International Searching Authority dated Jan. 27, 2021 (7 pgs.).

* cited by examiner

SYSTEM AND METHOD FOR MITIGATING PLATFORM MOTION IN A COMMUNICATIONS SYSTEM

FIELD

One or more aspects of embodiments according to the present invention relate to communications systems, and more particularly to a system and method for maintaining synchronization in a communications system.

BACKGROUND

In commercial communications systems (or in military communications systems), it may be advantageous for each of a plurality of transceivers exchanging data to be synchronized, so that, for example, frequency hopping may be performed reliably. In some situations, data may be transmitted between the transceivers via a repeater. Synchronization signals exchanged by the transceivers, may, in the presence of relative motion of the transceivers and the repeater, be affected by changes in propagation delay. Thus, there is a need for a system and method for mitigating platform motion in a communications system.

SUMMARY

According to an embodiment of the present invention, there is provided a method for stabilizing a reference clock of a client transceiver to a reference terminal in the presence of relative motion between the client transceiver and the reference terminal, the method including: transmitting, by the client transceiver, a probe packet to the reference terminal, receiving, by the client transceiver, the probe packet from the reference terminal, receiving, by the client transceiver, a first synchronization packet from the reference terminal, and adjusting the rate of the reference clock based on the time elapsed between: the transmitting, by the client transceiver of the probe packet to the reference terminal, and the receiving, by the client transceiver, the probe packet from the reference terminal; and based on the time of reception, by the client transceiver, of the probe packet.

In some embodiments, the method includes: receiving, by the client transceiver, a plurality of synchronization packets from the reference terminal, the plurality of synchronization packets including the first synchronization packet; adjusting the rate of a receive clock to track the plurality of synchronization packets received from the reference terminal; adjusting a transmit clock based on: a first correction signal, based on the adjusting of the rate of the receive clock; and a second correction signal, based on the time elapsed between: the transmitting, by the client transceiver of the probe packet to the reference terminal, and the receiving, by the client transceiver, of the probe packet from the reference terminal.

In some embodiments, the first correction signal is the opposite of a rate adjustment applied to the receive clock.

In some embodiments, the method includes: adjusting the rate of the reference clock based on a clock error signal, the clock error signal being calculated based on the difference, measured with respect to the clock, between: the average of: the time, as measured by the reference clock, of the occurrence of a reference event in the transmit clock, the time, as measured by the reference clock, of the occurrence of the reference event in the receive clock, and a scheduled time of occurrence of the reference event.

In some embodiments, the adjusting of the rate of the reference clock includes controlling the rate of the reference clock with a control signal based on a first term proportional to the clock error signal.

In some embodiments, the adjusting of the rate of the reference clock includes controlling the rate of the reference clock with a control signal based on a weighted sum, the weighted sum including the first term.

In some embodiments, the weighted sum further includes a second term proportional to an integral of the clock error signal.

In some embodiments, the method further includes: receiving, by the client transceiver, a plurality of synchronization packets from the reference terminal, the plurality of synchronization packets including the first synchronization packet; adjusting the rate of a receive clock to track the plurality of synchronization packets received from the reference terminal; adjusting a transmit clock based on: a first correction signal, based on the adjusting of the rate of the receive clock; and a second correction signal, based on the time elapsed between: the transmitting, by the client transceiver of the probe packet to the reference terminal, and the receiving, by the client transceiver, of the probe packet from the reference terminal.

In some embodiments, the first correction signal is the opposite of a rate adjustment applied to the receive clock.

In some embodiments, the adjusting of the rate of the reference clock includes controlling the rate of the reference clock with a control signal based on a weighted sum, the weighted sum including a first term proportional to the clock error signal, and a second term proportional to an integral of the clock error signal.

According to an embodiment of the present invention, there is provided a system for stabilizing a reference clock of a client transceiver to a reference terminal in the presence of relative motion between the client transceiver and the reference terminal, the reference terminal being configured to retransmit probe packets received from the client transceiver and to transmit a plurality of synchronization packets, the system including a client transceiver including a processing circuit, the processing circuit being configured to: cause the client transceiver to transmit a probe packet to the reference terminal, and after: receiving, by the client transceiver, the probe packet from the reference terminal, and receiving, by the client transceiver, a first synchronization packet, of the plurality of synchronization packets, from the reference terminal: adjust the rate of the reference clock based on the time elapsed between: the transmitting, by the client transceiver of the probe packet to the reference terminal, and the receiving, by the client transceiver, the probe packet from the reference terminal; and based on the time of reception, by the client transceiver, of the probe packet.

In some embodiments, the processing circuit is configured to, after receiving, by the client transceiver, the plurality of synchronization packets from the reference terminal: adjust the rate of a receive clock to track the plurality of synchronization packets received from the reference terminal; adjust a transmit clock based on: a first correction signal, based on the adjusting of the rate of the receive clock; and a second correction signal, based on the time elapsed between: the transmitting, by the client transceiver of the probe packet to the reference terminal, and the receiving, by the client transceiver, of the probe packet from the reference terminal.

In some embodiments, the first correction signal is the opposite of a rate adjustment applied to the receive clock.

In some embodiments, the processing circuit is configured to: adjust the rate of the reference clock based on a clock error signal, the clock error signal being calculated based on the difference, measured with respect to the clock, between: the average of: the time, as measured by the reference clock, of the occurrence of a reference event in the transmit clock, the time, as measured by the reference clock, of the occurrence of the reference event in the receive clock, and a scheduled time of occurrence of the reference event.

In some embodiments, the adjusting of the rate of the reference clock includes controlling the rate of the reference clock with a control signal based on a first term proportional to the clock error signal.

In some embodiments, the adjusting of the rate of the reference clock includes controlling the rate of the reference clock with a control signal based on a weighted sum, the weighted sum including the first term.

In some embodiments, the weighted sum further includes a second term proportional to an integral of the clock error signal.

In some embodiments, the processing circuit is further configured to, after receiving, by the client transceiver, the plurality of synchronization packets from the reference terminal: adjust the rate of a receive clock to track the plurality of synchronization packets received from the reference terminal; adjust a transmit clock based on: a first correction signal, based on the adjusting of the rate of the receive clock; and a second correction signal, based on the time elapsed between: the transmitting, by the client transceiver of the probe packet to the reference terminal, and the receiving, by the client transceiver, of the probe packet from the reference terminal.

In some embodiments, the first correction signal is the opposite of a rate adjustment applied to the receive clock.

In some embodiments, the adjusting of the rate of the reference clock includes controlling the rate of the reference clock with a control signal based on a weighted sum, the weighted sum including a first term proportional to the clock error signal, and a second term proportional to an integral of the clock error signal.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a system and method for mitigating platform motion in a communications system provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the scope of the invention. As denoted elsewhere herein, like element numbers are intended to indicate like elements or features.

Figure 1A:
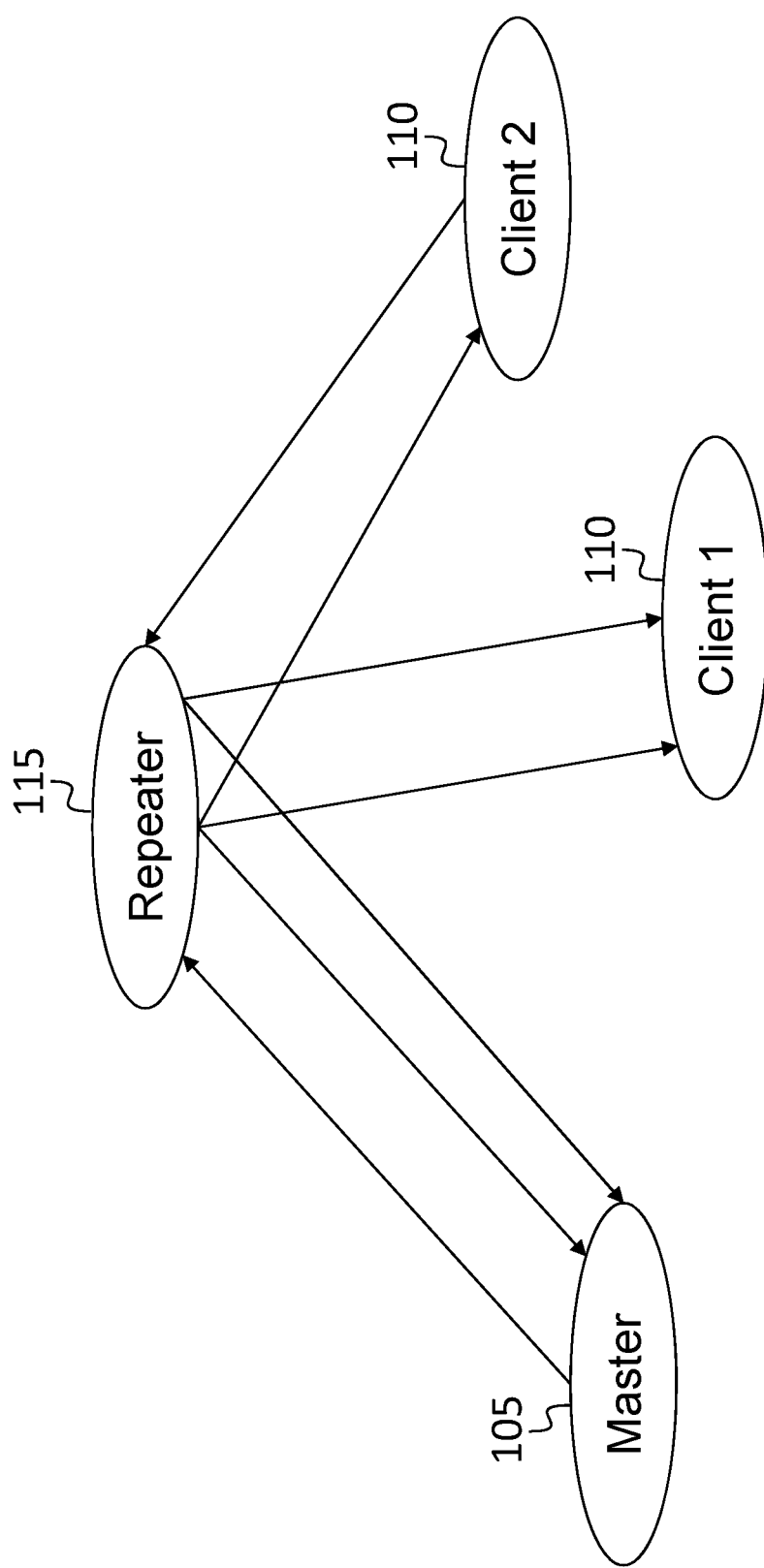
FIG. 1A is a schematic drawing of a communications system, according to an embodiment of the present invention.

Referring to FIG. 1A, in some embodiments, a communications network includes a master transceiver 105, one or more client transceivers 110, and a satellite. The satellite may operate as a repeater 115, or "bent pipe", and may simply retransmit any signals it receives with nominal (and substantially constant) delay. Each of the transceivers may transmit data to the repeater 115, and each of the transceivers may receive the data retransmitted by the repeater 115 (whether or not the retransmitted data were initially transmitted to the repeater 115 by the receiving transceiver or by another transceiver).

The repeater 115 may be a spacecraft orbiting the earth outside of the atmosphere, or it may be any other stationary or moving repeater, e.g., a repeater on an unmanned aerial vehicle (UAV). One or more of the transceivers may be on a moving platform (e.g., an aircraft or a ship). In some embodiments, the system operates in the presence of relative motion between the master transceiver and the repeater 115, and also in the presence of relative motion between each of the client transceivers and the repeater 115.

The communications may be a frequency hopping system or a time-division multiplexed system, or a hybrid system employing both time-division multiplexing and frequency hopping. In such a system, transmissions may occur during pre-defined time slots, and a frequency change may occur at some or all of the time slot boundaries. Each time slot may be referred to as a "hop". Some hops may be used to perform synchronization; such hops may be referred to as "synchronization hops" or "sync hops". In some embodiments, frequency hopping is not used, or time-division multiplexing is not used, and transmission units may generally be referred to as "packets", with packets used to perform synchronization being referred to as "synchronization packets" and other packets being referred to as "data packets".

Figure 1B:
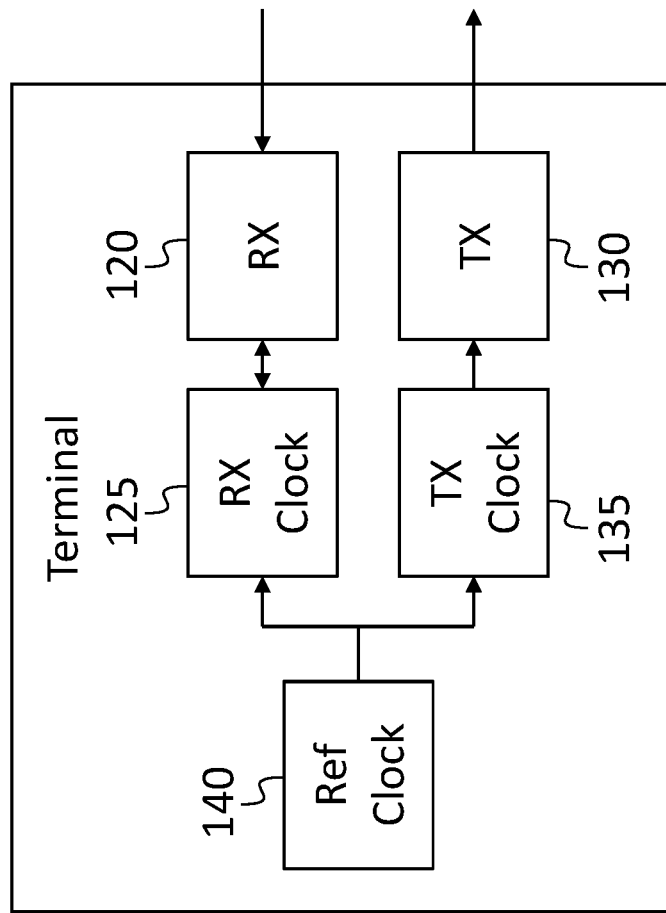
FIG. 1B is a block diagram of a transceiver, according to an embodiment of the present invention.

Referring to FIG. 1B, each of the transceivers may include a receiver 120 with a receive clock 125 and a transmitter 130 with a transmit clock 135. The respective rates of the transmit clock 135 and the receive clock 125 may be adjusted during operation to compensate for changes on propagation delay caused by the relative motion of the transceivers and the repeater. For example, the receive clock 125 may be adjusted so that, even in the presence of relative motion of the transceivers and the repeater, the receive frequency (e.g., the frequency of a local oscillator employed by the receiver) may switch at time slot boundaries. Each of the transmit clock 135 and the receive clock 125 may be implemented, for example, in a synchronous digital circuit, using an accumulator and an increment register. During each cycle of a reference clock 140, the contents of the increment register may be added to the accumulator. The rolling over of the respective accumulator may start a new cycle (or a new half cycle) of the transmit clock 135 or the receive clock 125. The rate of such a clock may be modified by writing a different value to the increment register. The offset of such a clock may also be adjustable, e.g., by writing a modified value to the accumulator.

Synchronization packets may be transmitted according to a predetermined schedule, which may be available to all of the transceivers. Each synchronization packet may include (e.g., consist of) a predetermined bit pattern, allowing any transceiver that receives the synchronization packet to determine accurately the extent to which the synchronization packet arrived earlier or later than expected. Any such error, in the time of reception, by the transceiver, of a synchronization packet, may be caused by, e.g., the relative motion of the transceivers and the repeater, or an error in the reference clock 140, or both. Such an error in the time of reception, by the transceiver, of a synchronization packet, may be used to adjust the rate of the receive clock 125 of the transceiver (e.g., by changing the value stored in the increment register).

Figure 1C:
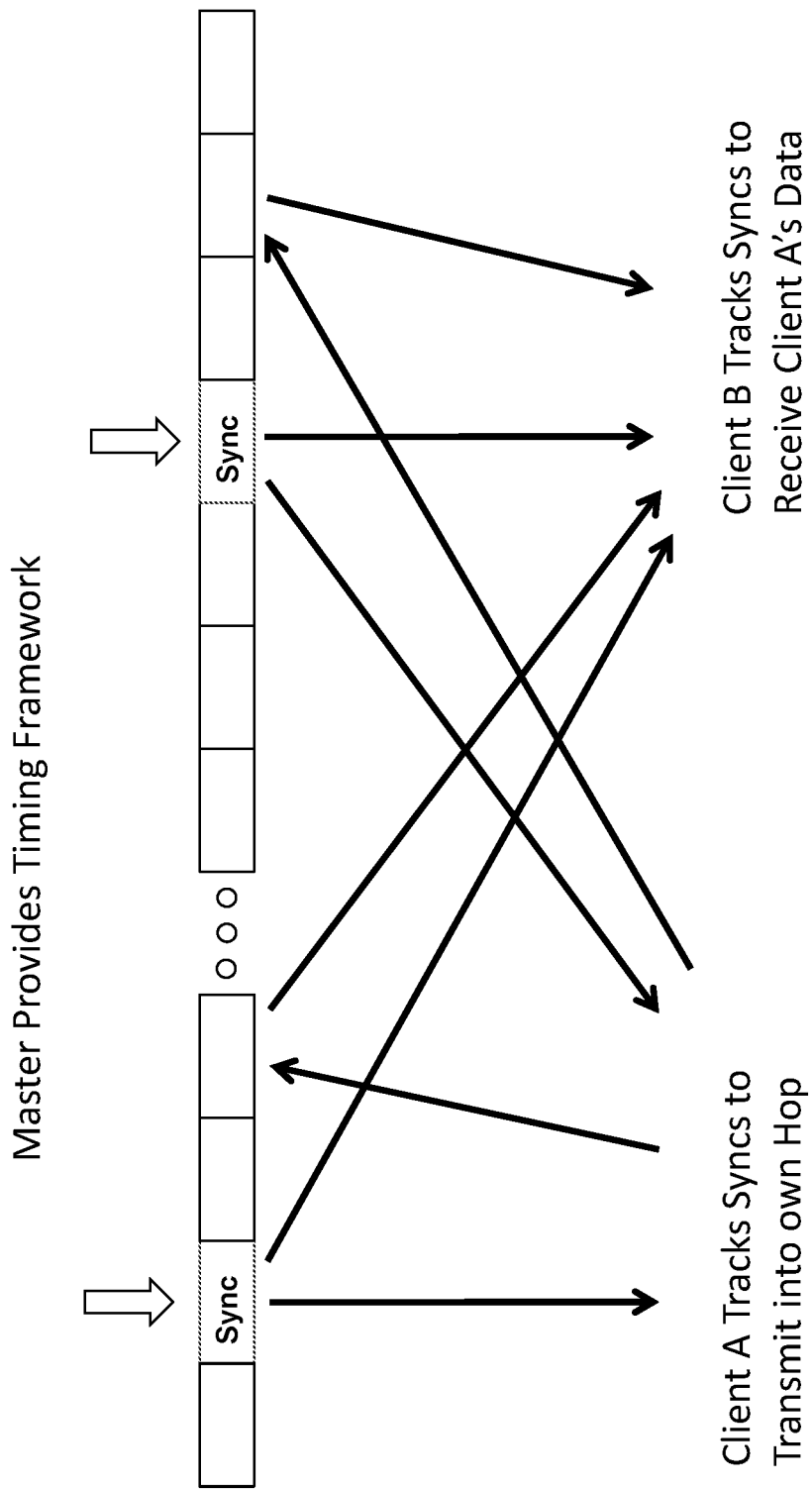
FIG. 1C is a synchronization signal transmission timing diagram, according to an embodiment of the present invention.

Referring to FIG. 1C, in some embodiments the master transceiver 105 provides a timing framework, sending synchronization packets. The timing framework may be a schedule with locations for packets or sequences that may be used to capture timing. The locations of these packets or sequences within this schedule may be known a priori by the master transceiver 105 and by the client transceiver(s) 110. Specific locations may be dedicated to specific client transceiver(s) 110. A packet used to capture timing may also carry some data. The schedule may be fixed or may change over time. A first client transceiver 110 (e.g., Client A) may track the received synchronization packets to transmit, at properly synchronized times, data packets of its own (e.g., in a hybrid system employing both time-division multiplexing and frequency hopping, to transmit a data packet (or "data hop") in a time slot allocated to Client A). A second client transceiver 110 may also track the synchronization packets, to receive, e.g., a data packet transmitted by Client A.

Figure 2A:
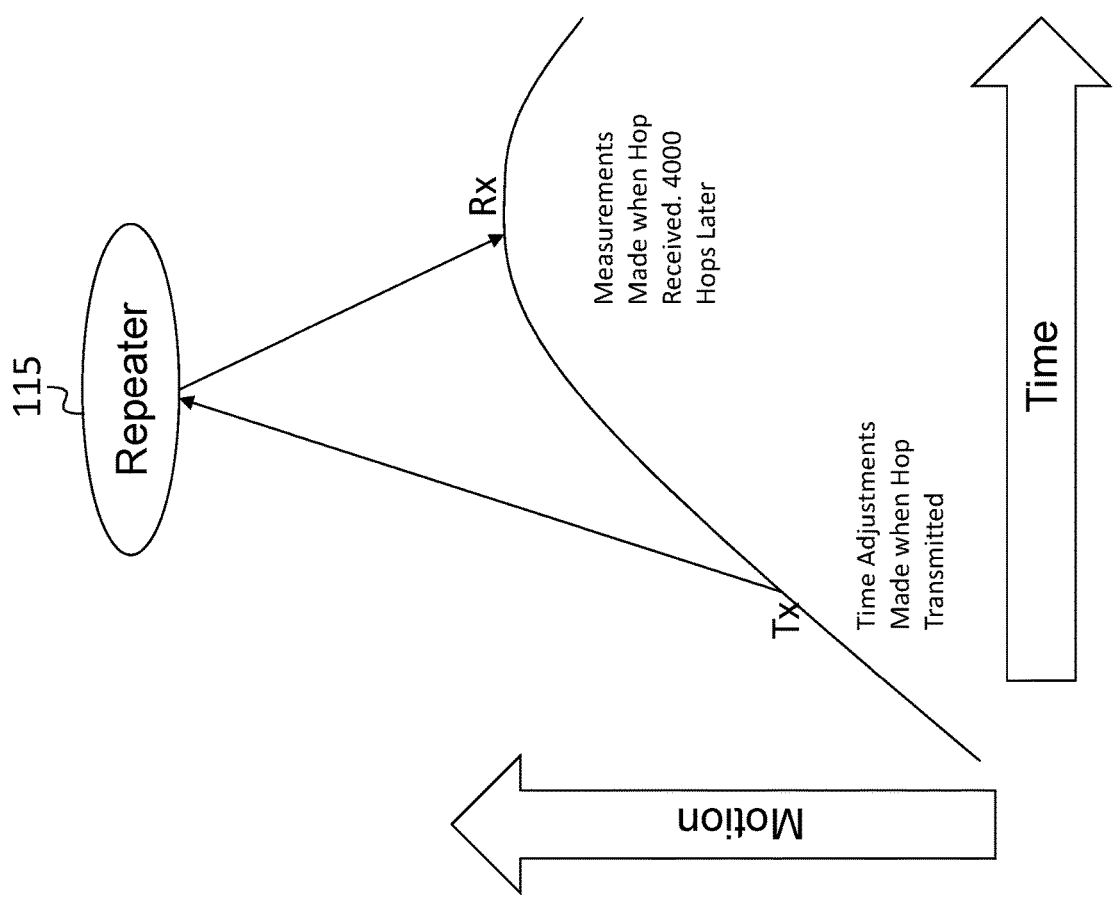
FIG. 2A is a schematic drawing of a communications system, according to an embodiment of the present invention.

In some embodiments, the transmit timing of the master transceiver 105 may be adjusted to compensate for relative motion of the master transceiver 105 and the repeater, so that the timing of the synchronization packets (and of the data packets) retransmitted by the repeater 115 is approximately the same as it would be in the absence of relative motion of the master transceiver 105 and the repeater. Referring to FIG. 2A, the master transceiver 105 may, as mentioned above, transmit a plurality of synchronization packets to the repeater. The master transceiver 105 may then, from the round-trip propagation delay to the repeater 115, of each of the synchronization packets, predict the round-trip propagation delay that, for example, the next synchronization packet to be transmitted by the master transceiver 105 is expected to experience. Based on this prediction, the master transceiver 105 may adjust the transmission time of the next synchronization packet so that it will be retransmitted by the repeater 115 at approximately the same time as if there were no relative motion of the master transceiver 105 and the repeater.

The prediction may be performed by an estimator, e.g., a Kalman filter. The estimator may estimate a plurality of elements of a state vector, based on the time elapsed between the transmitting of each of the plurality of synchronization packets from the master transceiver 105 to the repeater and the receiving of each of the plurality of synchronization packets, by the master transceiver 105, from the repeater. The elements of the state vector may be parameters of a model of the relative motion of the master transceiver 105 and the repeater; for example, the elements of the state vector may include the estimated round-trip delay, the estimated rate of change (i.e., first derivative with respect to time) of the round-trip delay, the estimated second derivative with respect to time of the round-trip delay, the estimated third derivative with respect to time of the round-trip delay, and the like.

The transmission time may then be adjusted by one half of the expected change, from nominal, in the predicted time of reception of the synchronization packet back at the master transceiver 105. A factor of one half may be used, based on the premise that it is the time of retransmission by the repeater (not the time of reception of the synchronization packet back at the master transceiver 105) that ideally is to be made independent of the relative motion of the transceivers and the repeater. In some embodiments the effect of the adjustment may be, or may be approximately, as follows. The time, $t_{tn}$, at which the $n^{th}$ pulse is transmitted (i.e., the adjusted transmission time), may be given by, or may be approximately given by:

$$t_{tn} = t_{tn0} - \frac{1}{2}(t_{me} - t_{m0})$$

where:

$t_{tn0}$ is the time at which the $n^{th}$ pulse is scheduled to be transmitted (i.e., the unadjusted transmission time), $t_{me}$ is the time at which the Kalman filter predicts reception of the $n^{th}$ pulse, if transmitted at the scheduled time, and $t_{m0}$ is the time at which the $n^{th}$ pulse would be received in the absence of the relative motion and in the absence of any adjustments to the transmission time.

This correction may be accomplished in the rate domain (instead of in the time offset domain), as follows (using the adjustability of the rate of the transmit clock 135). Half of the estimated future time rate may be applied to the transmit clock in a counter direction. If the estimated future time rate is expected to be x ns/second (i.e., synchronization packets are expected to be arriving faster), the transmit clock is slowed down by x/2 ns/second.

In some embodiments, half of the estimated future time rate is also applied in the future when the signal is received. A method for doing this is to subtract half of the previously estimated future time rate from the time rate predicted by the tracking loop for the current time. For example, a signal may be transmitted by the master transceiver at a current time $t_0$, that signal may be expected to arrive at the repeater at a future time $t_1$, and the signal retransmitted by the repeater may be expected to be received at the master transceiver at a future time $t_2$. At time $t_0$ the tracking loop is used to predict that at time $t_2$ the propagation time will be decreasing at a rate of x ns/second. At time $t_0$ the transmit clock of the master transceiver is slowed by x/2 ns/second. At time $t_2$ the tracking loop may, for example, predict that the propagation delay of the received signal is currently changing at y ns/second, and at time $t_2$ the receive clock may be sped up by (y−x/2) ns/second.

Figure 2B:
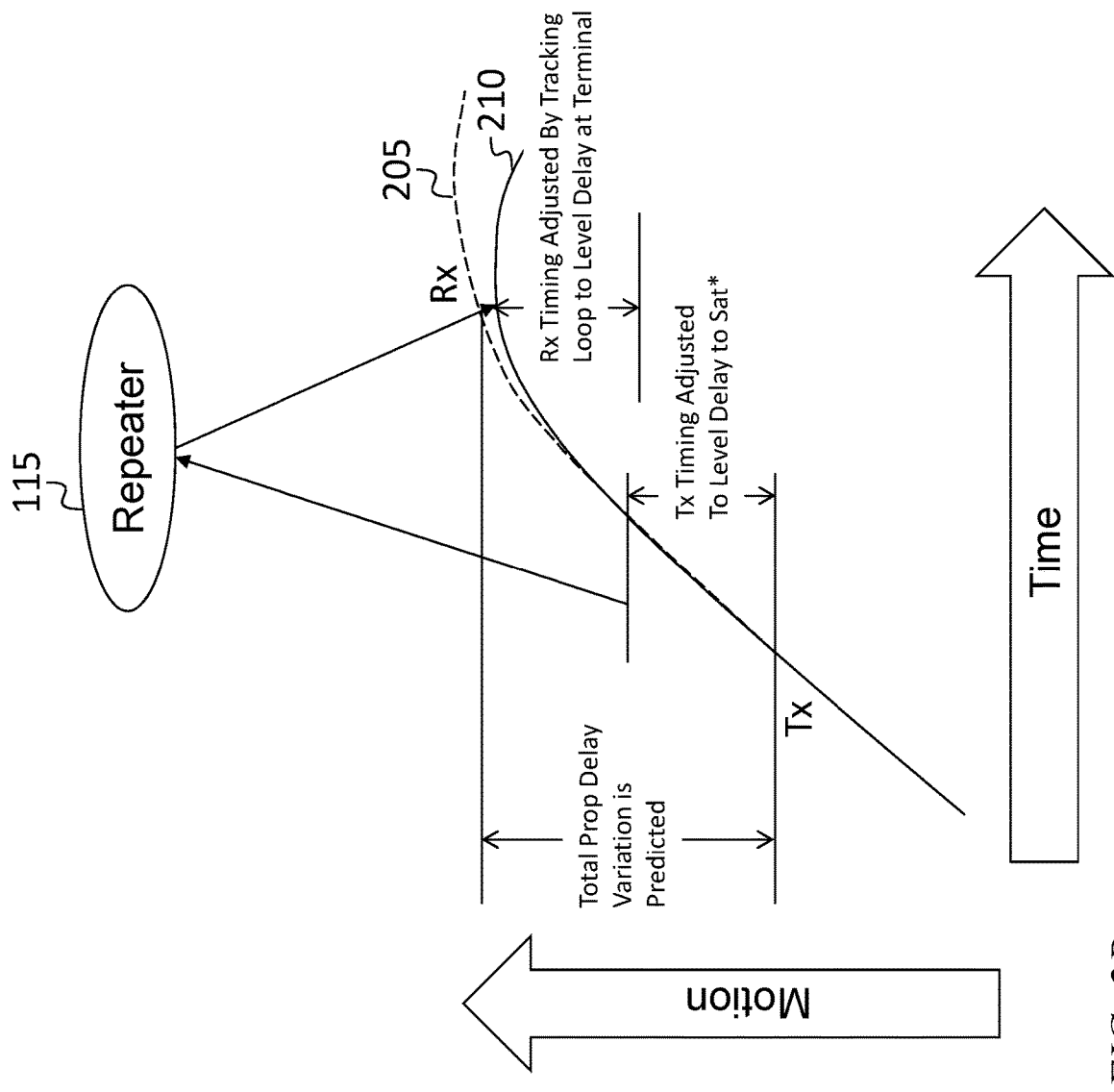
FIG. 2B is a schematic drawing of a communications system, according to an embodiment of the present invention.

FIG. 2B shows an example of such a method. In FIGS. 2A and 2B, the repeater 115 is stationary, and the master transceiver 105 is illustrated as moving; the analysis and behavior may be similar, however, if instead the repeater 115 is moving, or both are moving. As illustrated in FIG. 2B, the actual motion may not be precisely the same as the predicted motion; though they may differ, however, the variation of the retransmission time at the repeater 115 may nonetheless be less than it would be if no predictive correction were made.

Figure 3:
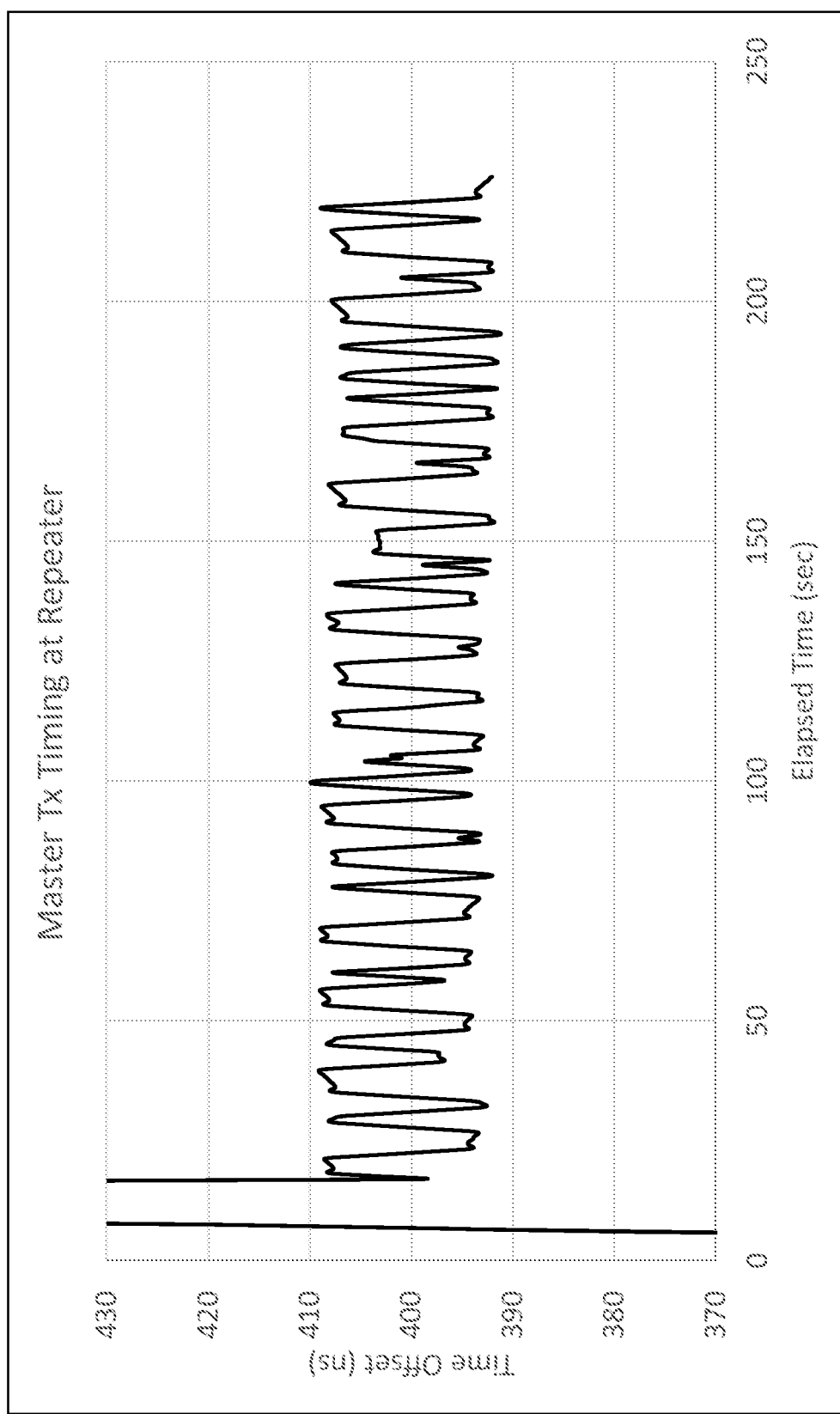
FIG. 3 is a graph of time offset as a function of time, according to an embodiment of the present invention.

FIG. 3 illustrates performance, measured as the variation of the retransmission time (or "time offset") at the repeater 115, as observed in a hardware-in-the loop simulation.

In some embodiments, the reference clock 140 of a client transceiver 110 may be stabilized to the reference clock 140 of the master transceiver 105. In such a system, the reference clock of the master transceiver 105 may be a highly stable, relatively costly clock (e.g., an atomic clock) and the reference clock of the client transceiver 110 may be a relatively inexpensive clock (e.g., a crystal oscillator), which, as a result of being stabilized to the reference clock of the master transceiver 105, may exhibit stability comparable to that of the reference clock of the master transceiver 105. In some embodiments, the reference clock 140 of the client transceiver 110 may be stabilized in a similar manner to another system including, or connected to, a stable time reference. For example, in some embodiments, the client transceiver 110 may exchange packets directly with the master transceiver 105 (without the packets' being retransmitted by an intervening repeater), or the repeater may include a stable time reference, and it may exchange packets with the client transceiver 110 to allow the reference clock 140 of the client transceiver 110 to be stabilized to the stable time reference of the repeater.

In operation, the receive clock 125 of the client transceiver 110 may track synchronization packets received from the master transceiver 105. This may result in the rate of the receive clock 125 of the client transceiver 110 being adjusted to compensate for (i) relative motion of the client transceiver 110 and the repeater 115 and (ii) any rate error of the reference clock 140 of the client transceiver 110. Further, in operation, the client transceiver 110 may periodically send "probe" packets to the repeater 115, and receive the retransmitted probe packets from the repeater 115, to measure the round-trip propagation time between the client transceiver 110 and the repeater 115.

The transmit clock 135 of the client transceiver 110 may then be adjusted based on two correction signals, (i) a first correction signal based on the adjusting of the rate of the receive packet trigger generator (in particular, the rate of the transmit clock 135 may be adjusted by the same amount as the receive clock, in the opposite direction); and (ii) a second correction signal, based on the round-trip propagation time between the client transceiver 110 and the repeater 115 (which may be used to adjust the offset of the transmit clock 135). The average of the transmit clock 135 and the receive clock 125 may then have a (low-frequency) stability comparable to that of the reference clock 140 of the master transceiver 105, because the relative motion of the client transceiver 110 and the repeater 115 (which results in equal and opposite adjustments to the respective rates of the receive clock 125 and the transmit clock 135) does not affect the average of the transmit clock 135 and the receive clock 125, and because the average of the transmit clock 135 and the receive clock 125 may be corrected (as a result of the adjustments described above) for any rate error (relative to the rate of the reference clock 140 of the master transceiver 105) in the reference clock 140 of the client transceiver 110.

Figure 4A:
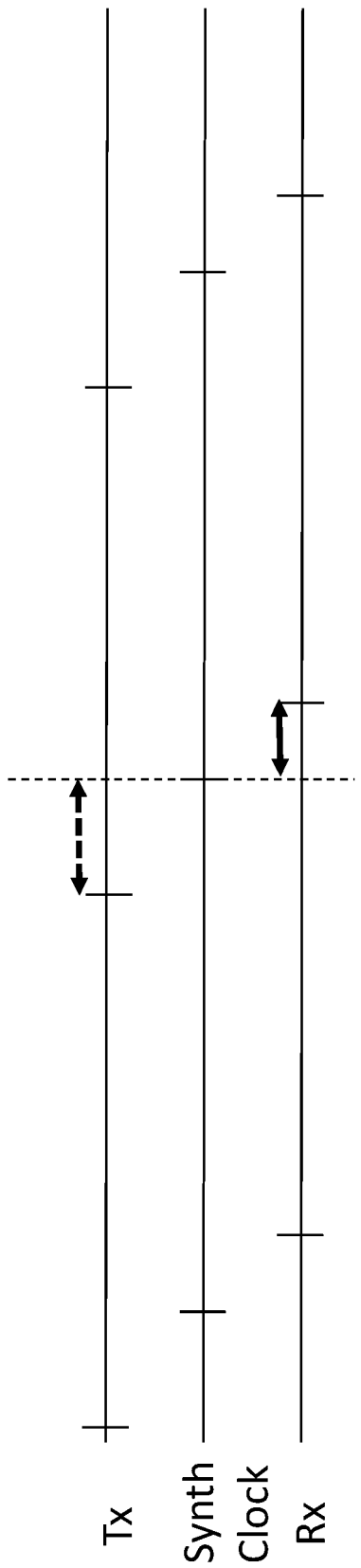
FIG. 4A is a timing diagram, according to an embodiment of the present invention.
Figure 4B:
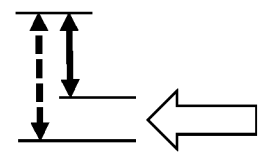
FIG. 4B is a timing diagram, according to an embodiment of the present invention.

FIGS. 4A and 4B illustrate this mode of operation, in which the difference between (i) a synthesized clock (e.g., the reference clock 140 of the client transceiver 110) and (ii) the average of the transmit clock 135 and the receive clock 125 (or, equivalently, the difference between the transmit time stamp (stamped with the synthesized clock) and the receive time stamp (also stamped with the synthesized clock)) is an error signal that may be used, for example, to adjust the rate of the reference clock 140 of the client transceiver 110. The transmit time stamp may be the time indicated by the reference clock when a reference event (e.g., a frame boundary) occurs in the transmit clock, and, similarly, the receive time stamp may be the time indicated by the reference clock when the reference event (e.g., the frame boundary) occurs in the receive clock. The reference events need not be periodic events but may occur at arbitrarily scheduled times, in which case the error signal may be the difference between (i) the average of the transmit time stamp and the receive time stamp for a reference event occurring at a scheduled time, and (ii) the scheduled time of occurrence of the reference event.

Figure 4C:
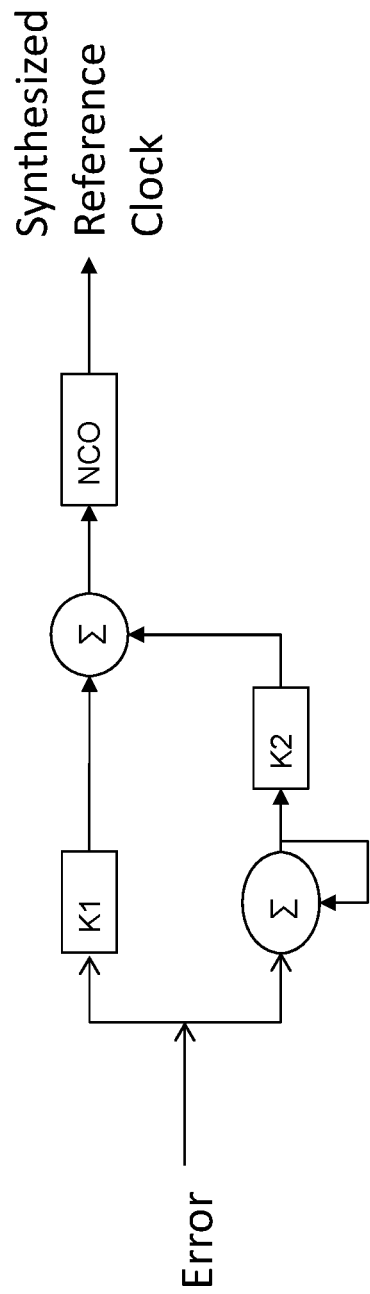
FIG. 4C is a block diagram of portion of a phase locked loop, according to an embodiment of the present invention.
Figure 5A:
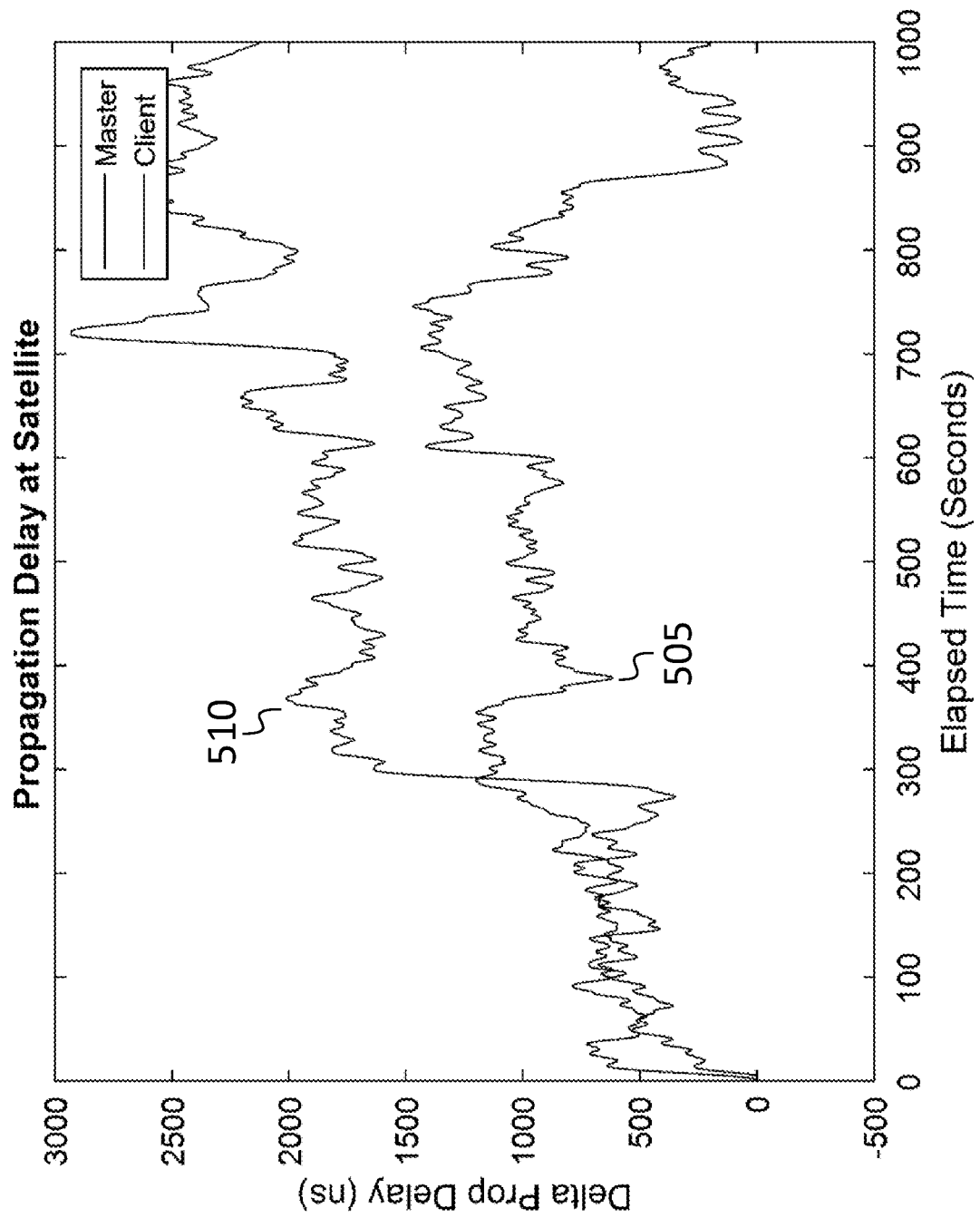
FIG. 5A is a graph of propagation delay as a function of time, according to an embodiment of the present invention.
Figure 5B:
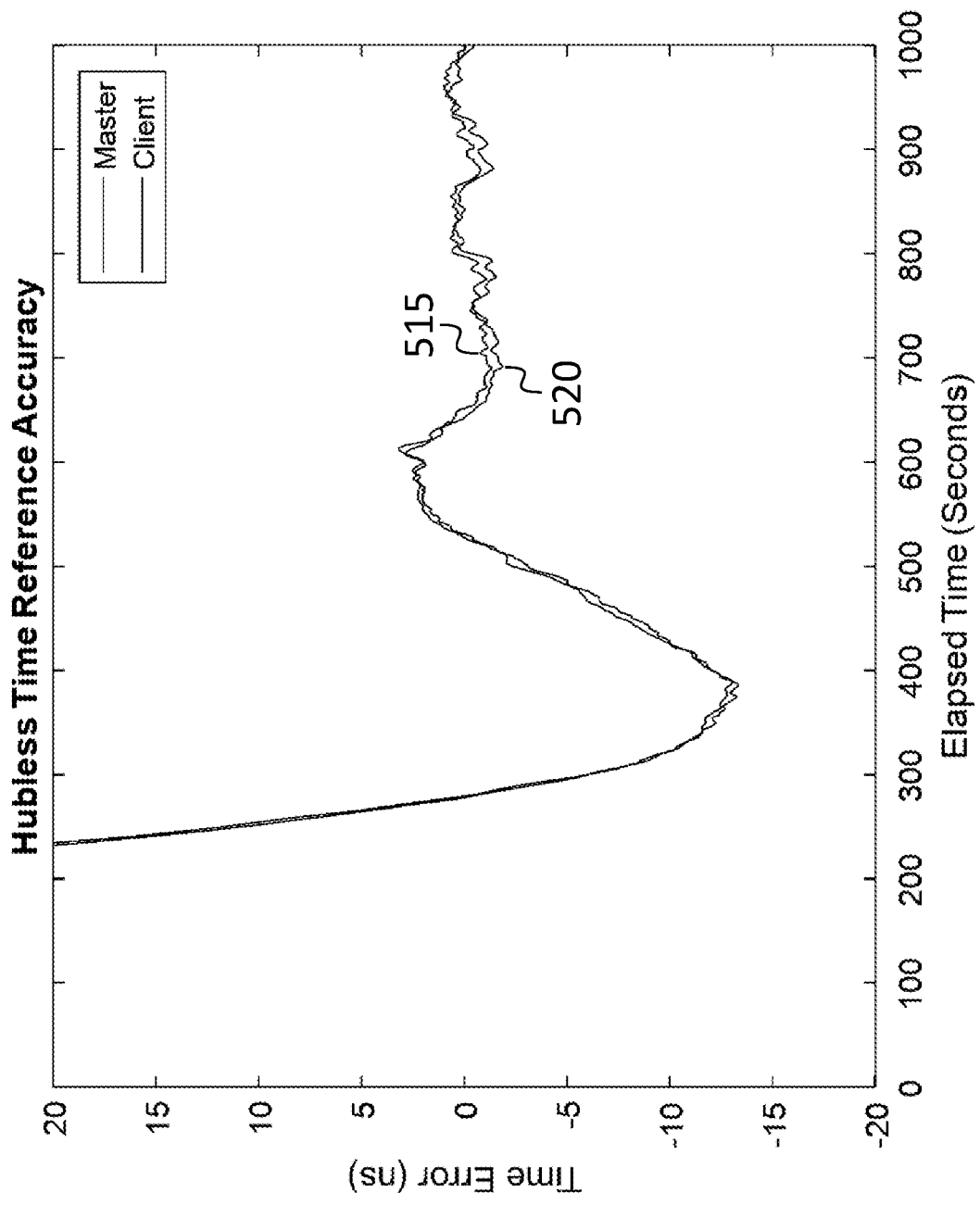
FIG. 5B is a graph of time reference accuracy as a function of time, according to an embodiment of the present invention.

The reference clock 140 of the client transceiver 110, offset by the error signal, may be a clock signal that has stability comparable to that of the reference clock 140 of the master transceiver 105; this signal may however be relatively noisy. As such, as shown in FIG. 4C, the error signal may be used as a part of a phase locked loop in which the reference clock 140 of the client transceiver 110 is the variable-rate oscillator. The error signal may be filtered by a filter that combines two components, a first component that is proportional to the error signal (with the weighting factor K1 as shown), and a second component that is proportional to the integral of the error signal (with the weighting factor K2 as shown). FIG. 5A shows simulated variations in propagation delay between the repeater and (i) (in a first curve 505) the master transceiver, and (ii) (in a second curve 510) a client transceiver. FIG. 5B shows, in a simulation including the stabilization of the reference clock of the client transceiver to the reference clock of the master transceiver, (i) (in a first curve 515) the time error of the master transceiver, and (ii) (in a second curve 520) the time error of the client transceiver.

The methods described herein may be further understood via the code in the code listings below. Each listing is labeled, at the top of the listing, with a filename. Filenames ending in ".m" label code written in the MATLAB™ programming language; the remaining listings are C++ code listings. The MATLAB™ code implements a simulation that includes both some of the methods described above and a simulation environment that simulates, e.g., the relative motion of the terminals and the repeater.

The listing sim01.m includes code for the top-level simulation function. Line 40 instantiates, in the variable em, an instance of the eventMgr (event manager) class (defined in eventMgr.m). The loop extending from line 50 to line 97 sets up the transceivers (or "terminals") to be simulated, adding TxFrame and RxFrame events to the event manager's event queue for each terminal (at lines 64 and 70). Each frame, in the simulation, has a duration of 20 ms and consists of a plurality of hops, and is the level at which synchronization is performed. The simulation then runs (i.e., simulates the passage of time) in the loop extending from line 108 to line 258. The switch statement beginning on line 112 takes appropriate action depending on the destination of the event being processed. If the destination is the satellite (i.e., the repeater, which is identified as destination (dest) number 0) then at line 141 the event is put back into the event queue with a new destination (the master transceiver, identified (on line 140) as destination number 1), and with a time (the time of reception generated, on line 159, by the motion manager (mm(1), an instance of motionclass, instantiated on line 7 and defined in motionclass.m). Because the repeater 115 is broadcasting to all of the terminals, then a duplicate (or "clone") of the event is (at line 151) placed into the event queue for each of the terminals, each clone having the corresponding terminal as its destination (line 149), and a time generated (on line 150) by the corresponding motion manager.

At line 167 and the lines that follow it, the simulation handles events that are for one of the terminals (i.e., not for the repeater and not for the simulation itself). At line 173, if the event is the receipt of a synchronization packet, then the function handleRxEvent (in handleRxEvent.m) is called. This function causes the receive clock of the terminal to be adjusted based on any discrepancy between the time of reception of the synchronization packet and the expected time of reception of the synchronization packet. Line 184 corresponds to a transition to a new frame in the receiver, e.g., the rolling over of the accumulator of the receive clock of the terminal.

At line 189 the simulation handles a Tx frame event, which occurs when the terminal passes a known time increment such as a frame, e.g., when the accumulator of the transmit clock of the terminal rolls over. A list of hops to be transmitted during the next frame is created (by a call, on line 191, to the function handleTxFrame, in handleTxFrame.m), and (in the loop extending from line 196 to line 209), for each of the hops, an event corresponding to the hop's reception at the repeater 115 is added to the event queue. At lines 210-224, the code is converting time error in Frame #'s into time error in seconds as well as keeping track of the appropriate time shifts based on the applicable terminal in the network.

The listing handleRxEvent.m includes code for simulating the reception by a terminal of a synchronization packet (or "sync", or "synchronization hop"). On lines 12 and 13, a time error (timeErr), that corresponds to the difference between the time of reception of the synchronization packet and the expected time of reception of the synchronization packet, is calculated. On line 14 and 15, simulated noise is added to timeErr to form a simulated measured error (timeMeas). This value is passed to the receive tracker (the simulation of which is implemented in C++ code) at lines 18 and 19.

If the simulation determines on line 32 that the source of the received synchronization packet is the receiving terminal itself, then the synchronization packet is termed a "probe" packet and is used for transmit tracking. The difference between the time of reception of the probe packet and the expected time of reception of the probe packet (represented as a sign (isLate) and a magnitude (errMag)) is passed into the transmit tracker at line 64. The estimated rate of change of the round trip delay is then returned from the Kalman filter (along with the estimated error (the square root of the variance estimated by the Kalman filter)) on line 67.

The listing handleRxFrame.m includes the function handleRxFrame (mentioned above) which includes code for simulating a receive frame boundary (corresponding to the rolling over of the accumulator of the receive clock of the terminal). The receive tracker is called at lines 15 and 16, and the rate of the terminal's transmit clock and receive clock are set, based on the output of the tracker, at lines 24 and 26, respectively. The output of the tracker is one half of the estimated future time rate (with the multiplication by one half being performed on lines 239 and 240 of the listing TrackingLoop.cpp).

The listing trackLib.cpp contains definitions of various functions called by the MATLAB™ code including the function ftLoop_addTimeErrorMeasurement on line 161, the function thoop_loadHwMeasurements on line 186, the function select_tLoop on line 131, the function txTrack_select on line 8, the function txTrack_init on line 20, the function txTrack_getAccuracy on line 46, the function txTrack_calcMeasAccuracy on line 25, the function txTrack_update on line 32, and the function tLoop_processLoop2 on line 213.

As used herein, the word "or" is inclusive, so that, for example, "A or B" means any one of (i) A, (ii) B, and (iii) A and B. As used herein, when a method (e.g., an adjustment) or a first quantity (e.g., an element of a state vector) is referred to as being "based on" a second quantity (e.g., a time interval) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory) as the second quantity.

In some embodiments, methods described herein are performed in the transceivers by one or more processing circuits. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

Although limited embodiments of a system and method for mitigating platform motion in a communications system have been specifically described and illustrated herein, many modifications and variations will be apparent to those skilled in the art. Accordingly, it is to be understood that a system and method for mitigating platform motion in a communications system employed according to principles of this invention may be embodied other than as specifically described herein. The invention is also defined in the claims below, and equivalents thereof.

What is claimed is:

1. A method for stabilizing a reference clock of a client transceiver to a reference terminal in the presence of relative motion between the client transceiver and the reference terminal, the method comprising:
    transmitting, by the client transceiver, a probe packet to the reference terminal,
    receiving, by the client transceiver, the probe packet from the reference terminal,
    receiving, by the client transceiver, a first synchronization packet from the reference terminal, and
    adjusting the rate of the reference clock
        based on the time elapsed between:
            the transmitting, by the client transceiver of the probe packet to the reference terminal, and
            the receiving, by the client transceiver, the probe packet from the reference terminal; and based on the time of reception, by the client transceiver, of the probe packet.

2. The method of claim 1, comprising:
receiving, by the client transceiver, a plurality of synchronization packets from the reference terminal, the plurality of synchronization packets including the first synchronization packet;
adjusting the rate of a receive clock to track the plurality of synchronization packets received from the reference terminal;
adjusting a transmit clock based on:
 a first correction signal, based on the adjusting of the rate of the receive clock; and
 a second correction signal, based on the time elapsed between:
  the transmitting, by the client transceiver of the probe packet to the reference terminal, and
  the receiving, by the client transceiver, of the probe packet from the reference terminal.

3. The method of claim 2, wherein the first correction signal is the opposite of a rate adjustment applied to the receive clock.

4. The method of claim 1, comprising:
adjusting the rate of the reference clock based on a clock error signal, the clock error signal being calculated based on the difference, measured with respect to the clock, between:
 the average of:
  the time, as measured by the reference clock, of the occurrence of a reference event in the transmit clock,
  the time, as measured by the reference clock, of the occurrence of the reference event in the receive clock, and
 a scheduled time of occurrence of the reference event.

5. The method of claim 4, wherein the adjusting of the rate of the reference clock comprises controlling the rate of the reference clock with a control signal based on a first term proportional to the clock error signal.

6. The method of claim 5, wherein the adjusting of the rate of the reference clock comprises controlling the rate of the reference clock with a control signal based on a weighted sum, the weighted sum including the first term.

7. The method of claim 6, wherein the weighted sum further includes a second term proportional to an integral of the clock error signal.

8. The method of claim 4, further comprising:
receiving, by the client transceiver, a plurality of synchronization packets from the reference terminal, the plurality of synchronization packets including the first synchronization packet;
adjusting the rate of a receive clock to track the plurality of synchronization packets received from the reference terminal;
adjusting a transmit clock based on:
 a first correction signal, based on the adjusting of the rate of the receive clock; and
 a second correction signal, based on the time elapsed between:
  the transmitting, by the client transceiver of the probe packet to the reference terminal, and
  the receiving, by the client transceiver, of the probe packet from the reference terminal.

9. The method of claim 8, wherein the first correction signal is the opposite of a rate adjustment applied to the receive clock.

10. The method of claim 9, wherein the adjusting of the rate of the reference clock comprises controlling the rate of the reference clock with a control signal based on a weighted sum, the weighted sum including a first term proportional to the clock error signal, and a second term proportional to an integral of the clock error signal.

11. A system for stabilizing a reference clock of a client transceiver to a reference terminal in the presence of relative motion between the client transceiver and the reference terminal, the reference terminal being configured to retransmit probe packets received from the client transceiver and to transmit a plurality of synchronization packets, the system comprising a client transceiver comprising a processing circuit, the processing circuit being configured to:
cause the client transceiver to transmit a probe packet to the reference terminal, and
after:
 receiving, by the client transceiver, the probe packet from the reference terminal, and
 receiving, by the client transceiver, a first synchronization packet, of the plurality of synchronization packets, from the reference terminal:
adjust the rate of the reference clock
 based on the time elapsed between:
  the transmitting, by the client transceiver of the probe packet to the reference terminal, and
  the receiving, by the client transceiver, the probe packet from the reference terminal; and
 based on the time of reception, by the client transceiver, of the probe packet.

12. The system of claim 11, wherein the processing circuit is configured to, after receiving, by the client transceiver, the plurality of synchronization packets from the reference terminal:
adjust the rate of a receive clock to track the plurality of synchronization packets received from the reference terminal;
adjust a transmit clock based on:
 a first correction signal, based on the adjusting of the rate of the receive clock; and
 a second correction signal, based on the time elapsed between:
  the transmitting, by the client transceiver of the probe packet to the reference terminal, and
  the receiving, by the client transceiver, of the probe packet from the reference terminal.

13. The system of claim 12, wherein the first correction signal is the opposite of a rate adjustment applied to the receive clock.

14. The system of claim 11, wherein the processing circuit is configured to:
adjust the rate of the reference clock based on a clock error signal, the clock error signal being calculated based on the difference, measured with respect to the clock, between:
 the average of:
  the time, as measured by the reference clock, of the occurrence of a reference event in the transmit clock,
  the time, as measured by the reference clock, of the occurrence of the reference event in the receive clock, and
 a scheduled time of occurrence of the reference event.

15. The system of claim 14, wherein the adjusting of the rate of the reference clock comprises controlling the rate of the reference clock with a control signal based on a first term proportional to the clock error signal.

16. The system of claim 15, wherein the adjusting of the rate of the reference clock comprises controlling the rate of the reference clock with a control signal based on a weighted sum, the weighted sum including the first term.

17. The system of claim 16, wherein the weighted sum further includes a second term proportional to an integral of the clock error signal.

18. The system of claim 14, wherein the processing circuit is further configured to, after receiving, by the client transceiver, the plurality of synchronization packets from the reference terminal:
- adjust the rate of a receive clock to track the plurality of synchronization packets received from the reference terminal;
- adjust a transmit clock based on:
  - a first correction signal, based on the adjusting of the rate of the receive clock; and
  - a second correction signal, based on the time elapsed between:
    - the transmitting, by the client transceiver of the probe packet to the reference terminal, and
    - the receiving, by the client transceiver, of the probe packet from the reference terminal.

19. The system of claim 18, wherein the first correction signal is the opposite of a rate adjustment applied to the receive clock.

20. The system of claim 19, wherein the adjusting of the rate of the reference clock comprises controlling the rate of the reference clock with a control signal based on a weighted sum, the weighted sum including a first term proportional to the clock error signal, and a second term proportional to an integral of the clock error signal.

\* \* \* \* \*